(12) United States Patent
Maccarone

(10) Patent No.: US 9,048,646 B2
(45) Date of Patent: Jun. 2, 2015

(54) GANGABLE ELECTRICAL BOX EXTENDER

(75) Inventor: David Maccarone, Hudson, OH (US)

(73) Assignee: Thomas & Betts International, Inc., Wilmington, DE (US)

( * ) Notice: Subject to any disclaimer, the term of this patent is extended or adjusted under 35 U.S.C. 154(b) by 168 days.

(21) Appl. No.: 13/609,881

(22) Filed: Sep. 11, 2012

(65) Prior Publication Data

US 2013/0098653 A1 Apr. 25, 2013

Related U.S. Application Data

(60) Provisional application No. 61/551,140, filed on Oct. 25, 2011.

(51) Int. Cl.
*H02G 3/08* (2006.01)

(52) U.S. Cl.
CPC ........... *H02G 3/086* (2013.01); *Y10T 29/49002* (2013.01)

(58) Field of Classification Search
USPC .................. 174/50, 58, 53, 57; 220/4.02, 3.7; 439/535
See application file for complete search history.

(56) References Cited

U.S. PATENT DOCUMENTS

| | | | |
|---|---|---|---|
| 2,378,861 A * | 6/1945 | Peevey | 220/8 |
| 5,117,996 A * | 6/1992 | McShane | 220/3.7 |
| 5,736,674 A | 4/1998 | Gretz | |
| 5,959,246 A | 9/1999 | Gretz | |
| 5,975,323 A * | 11/1999 | Turan | 220/3.7 |
| 6,204,447 B1 | 3/2001 | Gretz | |
| 6,229,087 B1 * | 5/2001 | Archer | 174/50 |
| 6,369,322 B1 | 4/2002 | Gretz | |
| 6,953,894 B2 | 10/2005 | Ungerman et al. | |
| 7,002,076 B2 | 2/2006 | Ungerman et al. | |
| 7,077,280 B1 | 7/2006 | Gretz | |
| 7,235,739 B2 | 6/2007 | King, Jr. et al. | |
| 7,273,982 B1 * | 9/2007 | Lalancette | 174/58 |
| 7,350,659 B1 * | 4/2008 | Gretz | 220/3.2 |

FOREIGN PATENT DOCUMENTS

CA   2316552   *   6/2006   ............... H02G 3/12

* cited by examiner

*Primary Examiner* — Dhirubhai R Patel
(74) *Attorney, Agent, or Firm* — Snyder, Clark, Lesch & Chung, LLP

(57) ABSTRACT

An electrical box extender includes a rectangular tube having a first pair of opposing sides and a second pair of opposing sides. The first pair of opposing sides and the second pair of opposing sides form a perimeter configured to fit within a single-gang electrical box. The electrical box extender also includes a set of flanges extending laterally from a front edge of the first pair of opposing sides. The set of flanges includes a male interlocking flange and a female interlocking flange. The male interlocking flange is configured to attach to another female interlocking flange of a substantially identical electrical box extender.

22 Claims, 11 Drawing Sheets

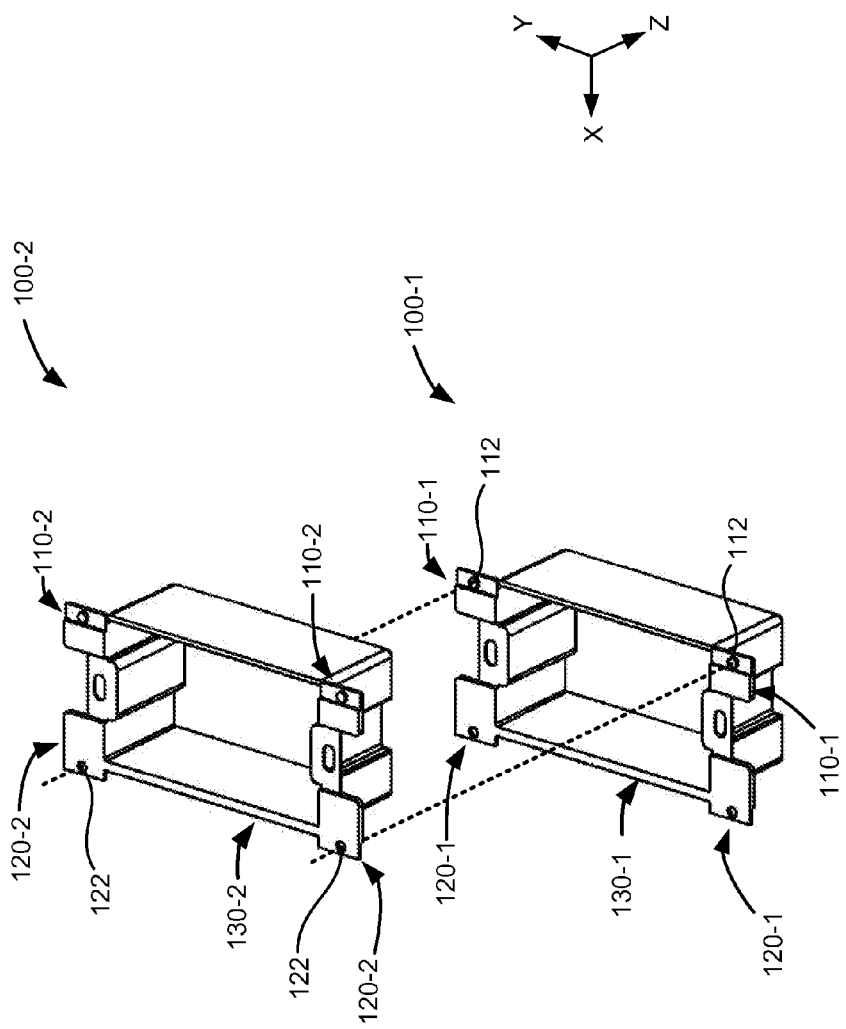

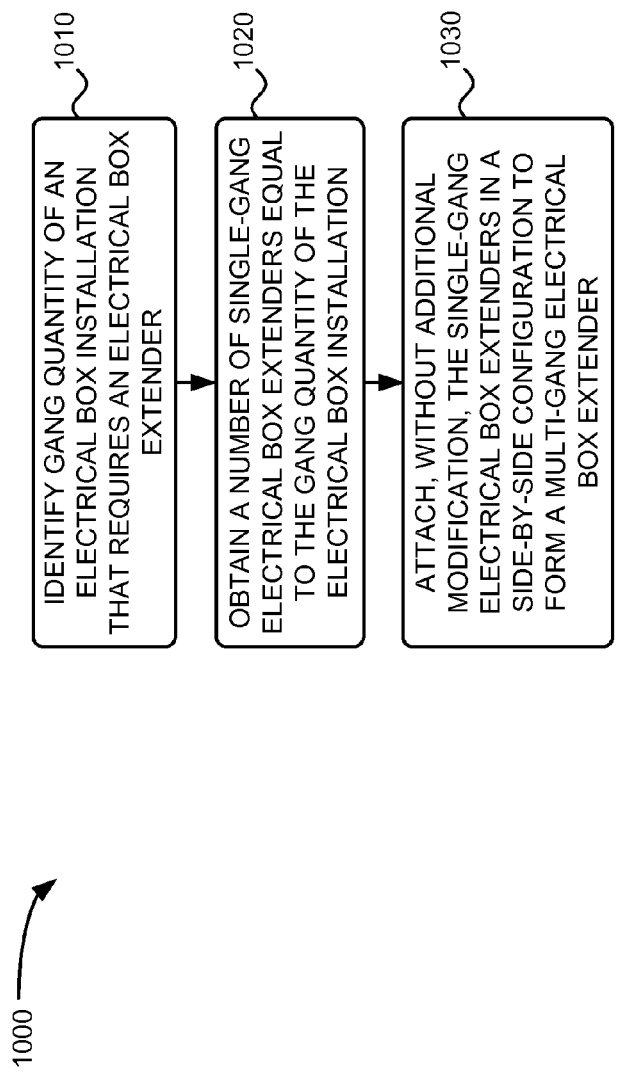

GANGABLE ELECTRICAL BOX EXTENDER

CROSS-REFERENCE TO RELATED APPLICATION

This application claims priority under 35 U.S.C. §119, based on U.S. Provisional Patent Application No. 61/551,140, filed Oct. 25, 2011, the disclosure of which is hereby incorporated by reference herein.

BACKGROUND INFORMATION

Electrical box extenders may be added to an existing electrical box installation to create additional depth. When changes are made to an existing wall surface of a home, such as addition of a tile surface, paneling, or another drywall layer, the existing electrical boxes may be inset too far from the newly finished surface. Generally, a box extender may be required when the front face of an electrical box is recessed from the finished surface of a wall by more than one-quarter of an inch.

Electrical boxes may be designed to accommodate a particular number of electrical components, such as a switch or an outlet. An electrical box configured to hold a single electrical component may be referred to as a single-gang box. An electrical box configured to hold multiple electrical components may be referred to generally as a multi-gang box or, more particularly, as a double-gang box, triple-gang box, etc., depending on the particular number of electrical components the particular electrical box is designed to hold.

BRIEF DESCRIPTION OF THE DRAWINGS

FIGS. 6A and 6B are isometric views of two electrical box extenders joined in a double-gang configuration according to an implementation described herein;

FIG. 10 is a flowchart of an exemplary process for forming a multi-gang electrical box extender, according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to implementations described herein, a single-gang electrical box extender may be configured to permit joining with one or more identical electrical box extenders to form a multi-gang box extender. The electrical box extenders may include interlocking components to allow for joining together, side-by-side and without modification, and to maintain spacing for multi-gang installations (e.g., single-gang, double-gang, triple-gang, etc.) in accordance with electrical codes. In one implementation, an electrical box extender may include a rectangular tube having a first pair of opposing sides and a second pair of opposing sides. The first pair of opposing sides and the second pair of opposing sides may form a perimeter configured to fit within a single-gang electrical box. A set of male and female interlocking flanges may extend laterally from a front edge of the first pair of opposing sides. The male or female interlocking flanges may be configured to attach to another female or male interlocking flange of a substantially identical electrical box extender.

Figure 1:
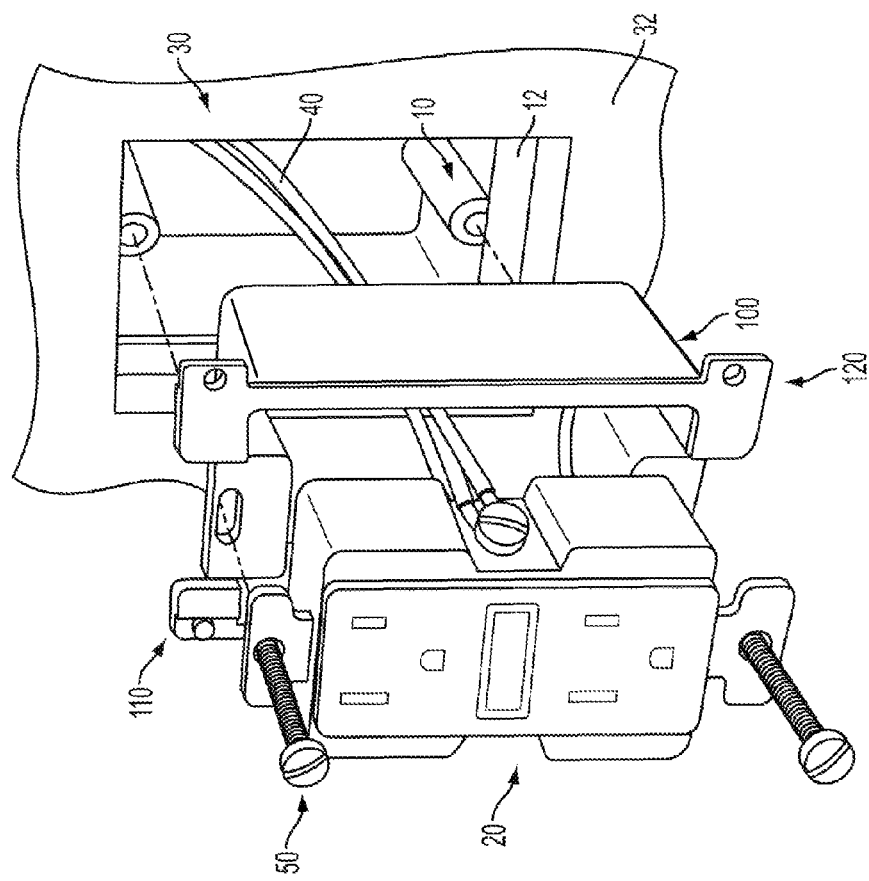
FIG. 1 provides an exploded view of an electrical component installation using an electrical box extender according to an implementation described herein.

FIG. 1 provides an exploded view of an electrical component installation using an electrical box extender according to an implementation described herein. Referring to FIG. 1, an electrical box extender 100 may be interposed between an electrical box 10 and an electrical component 20. Electrical box 10 may be secured within a portion of a wall 30. A front surface 12 of electrical box 10 may be recessed from a finished surface 32 of a wall 30. Electrical box extender 100 may include front and rear openings to allow wires 40 to pass from electrical box 10, through electrical box extender 100, and to electrical component 20. When installed, a portion of electrical box extender 100 may rest within electrical box 10. Screws 50 may pass through openings in electrical component 20 and electrical box extender 100 to secure electrical component 20 and electrical box extender 100 to electrical box 10. A set of flanges around a front surface of electrical box extender 100 may engage finished surface 32 of wall 30 to prevent electrical box extender 100 and electrical component 20 from being pushed into electrical box 10 beyond finished surface 32. As described further herein, the flanges may include a set of male flanges 110 and a set of female flanges 120.

In one implementation, electrical box extender 100 may be made of a single, molded piece. For example, suitable materials for electrical box extender 100 may include polycarbonate, nylon 6-6, or another non-electrically-conductive material. In other implementations, electrical box extender 100 may be formed by joining together multiple separate pieces.

In descriptions of electrical box extender 100 herein a "front surface" or "front edge" may generally refer to a surface/edge of electrical box extender 100 that faces towards a room's interior when electrical box extender 100 is installed in electrical box 10. Conversely, a "back surface" or "back edge" may generally refer to a surface/edge of electrical box extender 100 that faces towards a room's exterior when electrical box extender 100 is installed in electrical box 10.

Figure 2:
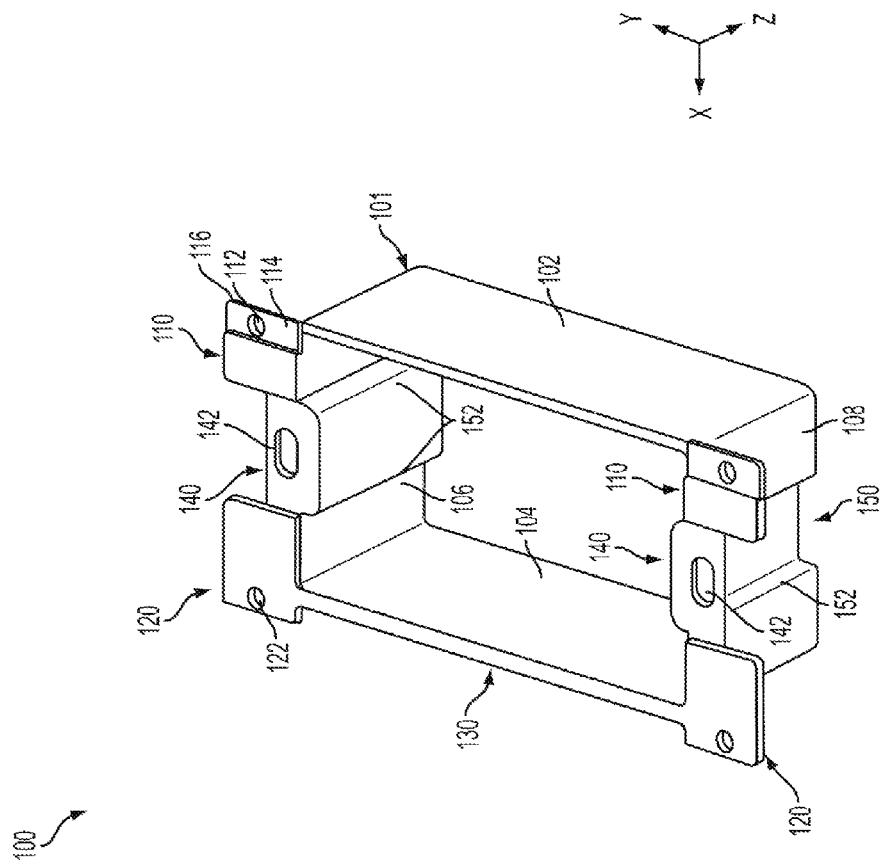
FIG. 2 is an isometric view of the electrical box extender of FIG. 1.
Figure 3:
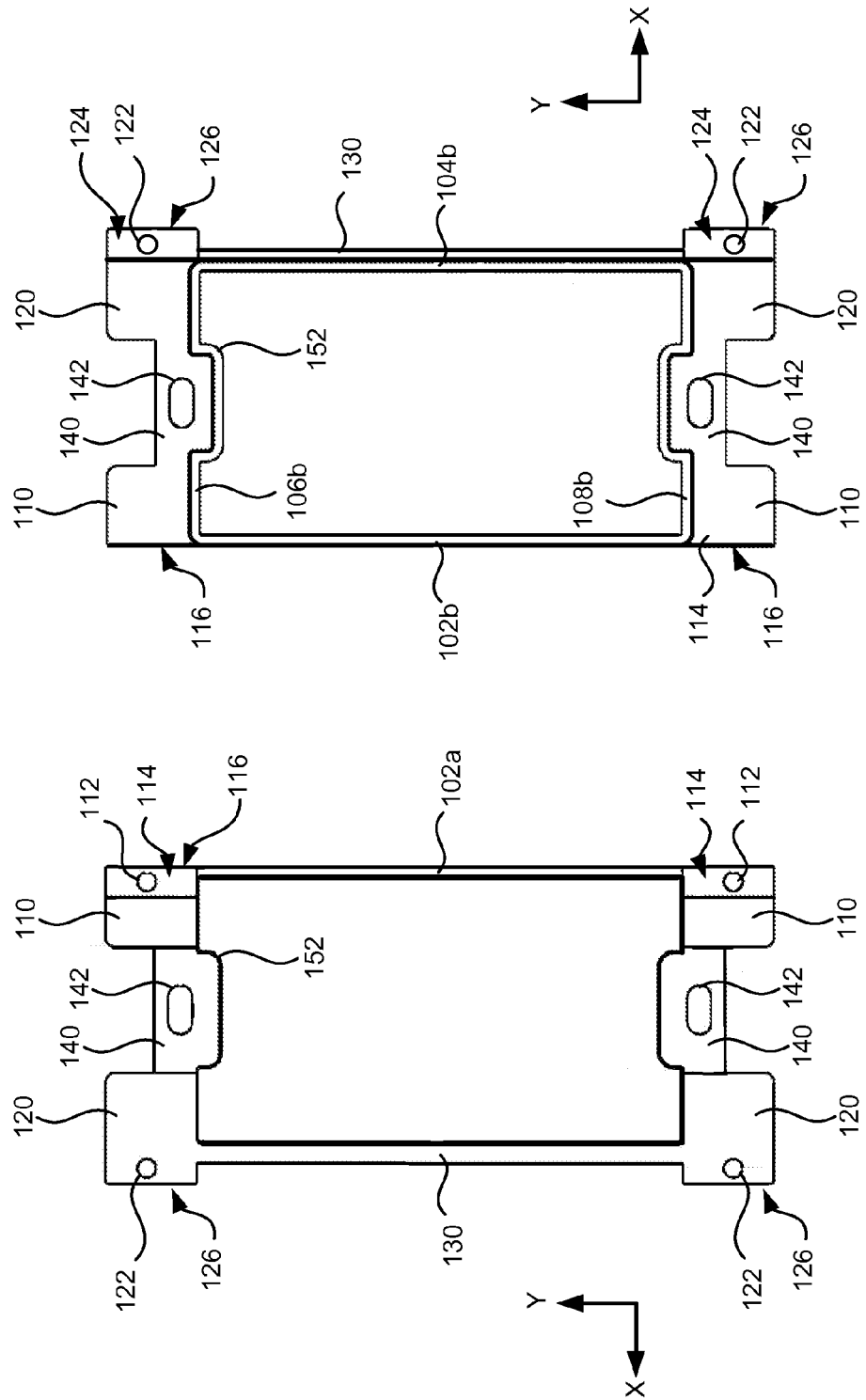
FIGS. 3A and 3B are a front view and a back view, respectively, of the electrical box extender of FIG. 1.
Figure 4:
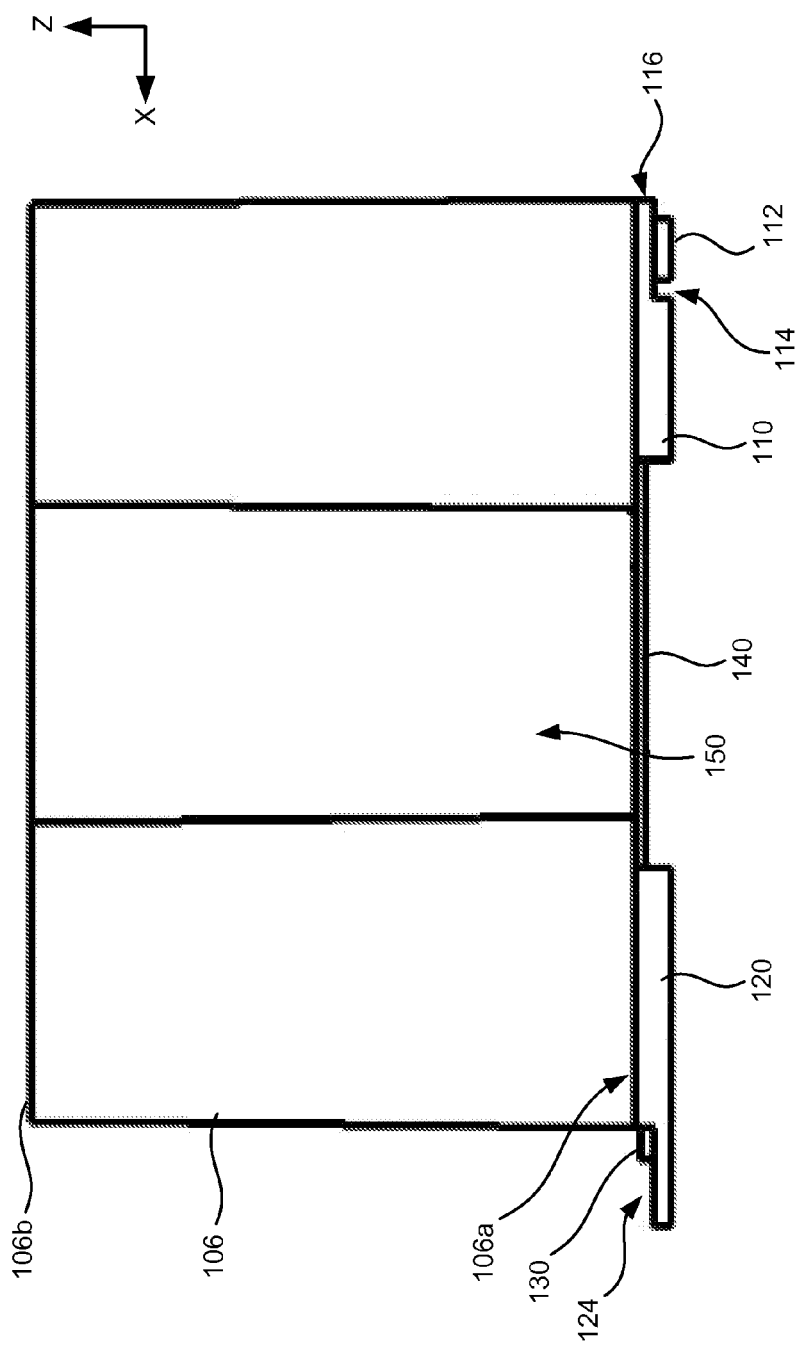
FIG. 4 is a top view of the electrical box extender of FIG. 1.
Figure 5:
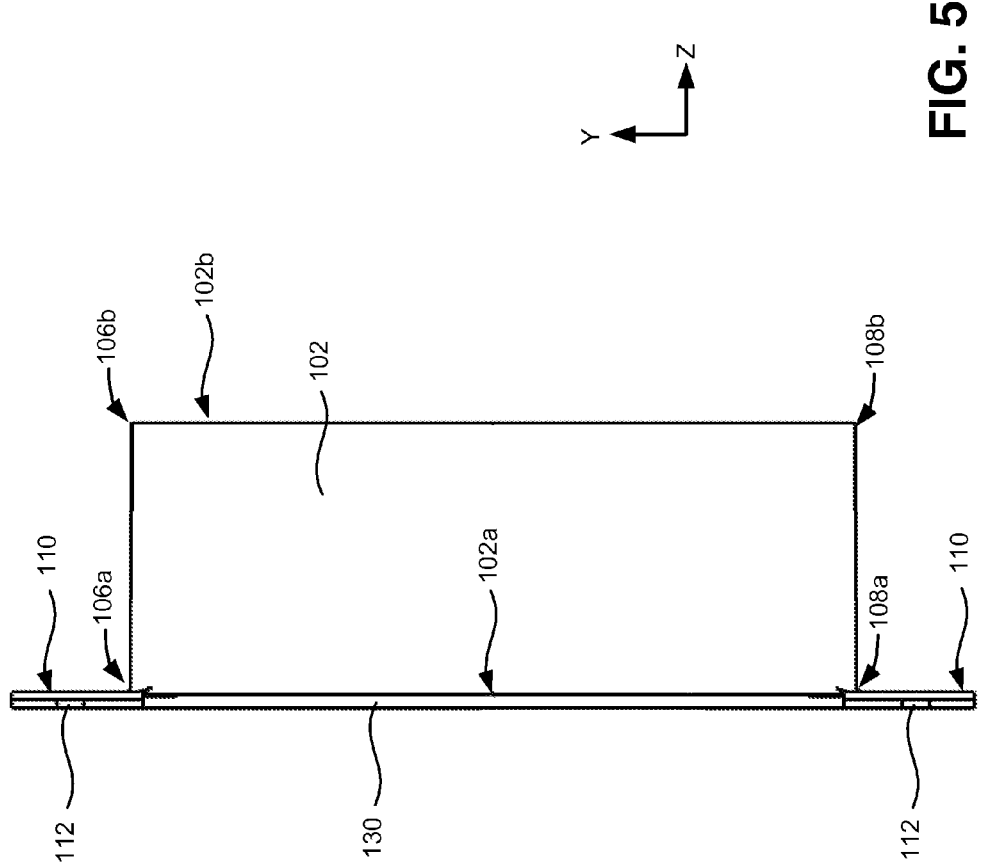
FIG. 5 is a side view of the electrical box extender of FIG. 1.

FIG. 2 is an isometric view of electrical box extender 100. FIGS. 3A-5 provide additional views of electrical box extender 100 that may also be referred to in the description below. FIGS. 3A and 3B provide a front view and a back view, respectively, of electrical box extender 100. FIGS. 4 and 5 provide a larger top view and side view, respectively, of electrical box extender 100.

Referring collectively to FIGS. 2-5, electrical box extender 100 may include a generally rectangular tube 101 including a first set of opposing sides 102, 104 and a second set of opposing sides 106, 108. Each of sides 102, 104, 106, and 108 may be connected to form a perimeter (e.g., along the X and Y axes) of rectangular tube 101 that may be generally sized to fit within a standard, single-gang, electrical box (e.g., electrical box 10). In one implementation, sides 102 and 104 may be approximately 3.168 inches long (e.g., in the Y-axis direction) and 1.18 inches deep (e.g., in the Z-axis direction); while sides 106 and 108 may be 1.79 inches wide (e.g., in the X-axis direction) and 1.18 inches deep (e.g., in the Z-axis direction). In one implementation, each of sides 102, 104, 106, and 108 is relatively thin (e.g., approximately 0.060 inches or thicker). The thickness of sides 102, 104, 106, and 108 and the fact that the sides are connected, provide for a generally inflexible structure of electrical box extender 100.

First set of opposing sides 102, 104 may generally include flat, essentially parallel walls. Second set of opposing sides 106, 108 may be essentially parallel and may each include a channel 150. Ridges 152 may extend from front to back (e.g., in the Z-axis direction) forming channel 150 and generally stiffening sides 106 and 108. In one implementation channel 150 may have a depth (e.g., in the Y-axis direction) of about 0.144 inches.

Sides 102, 104, 106, and 108 may each include a front edge 102a, 104a (not visible), 106a, and 108a, respectively. As described further herein, front edges 104a, 106a, and 108a are typically not visible due to the installation of male flanges 110, female flanges 120, support flange 130, and/or mounting flanges 140. By contrast, front edge 102a may not include a flange to permit, for example, ganging of multiple electrical box extenders 100, as described further herein. Each of front edges 102a, 104a, 106a, and 108a may generally remain outside electrical box 10 upon installation (e.g., due to engagement of flanges 110/120 with finished wall surface 32). In one implementation, front edges 102a, 104a, 106a, and 108a may be co-planar.

Sides 102, 104, 106, and 108 may also each include a back edge 102b, 104b, 106b, and 108b, respectively. Each of back edges 102b, 104b, 106b, and 108b may generally be slid into electrical box 10 upon installation. In one implementation, back edges 102b, 104b, 106b, and 108b may be co-planar. In one implementation, the perimeter (e.g., along the X and Y axes) of tube 101 along front edges 102a, 104a, 106a, and 108a and the perimeter of tube 101 (e.g., along the X and Y axes) of back edges 102b, 104b, 106b, and 108b may be same (e.g., such that sides of tube 101 do not taper inward or outward).

One male flange 110 and one female flange 120 may be disposed on each of edge 106a and edge 108a. Each male flange 110 and female flange 120 may extend perpendicular to the plane defined side 106. Each male flange 110 and female flange 120 may extend lengthwise (e.g., in a Y-axis direction) sufficiently to engage a wall (e.g., finished surface 32) or edge around an electrical box opening when electrical box extender 100 is inserted into electrical box 10. Thus, male flanges 110 and female flanges 120 may prevent electrical box extender 100 from being completely inserted into an electrical box (e.g., electrical box 10). In one implementation, each of male flange 110 and female flange 120 may extend (e.g., in the Y-axis direction) about 0.52 inches from front edge 106 or 108.

As shown in FIGS. 2, 3A, and 4, male flange 110 may include a side edge 116 that is aligned in the same plane as the outside surface of side 102. In one implementation, male flange 110 may have width (e.g., in the X-axis direction) of about 0.51 inches. Conversely, female flange 120 may include an opposite side edge 126 that extends beyond (e.g., in the X-axis direction) the plane of the outside surface of side 104. In one implementation, female flange 120 may have width (e.g., in the X-axis direction) of about 0.70 inches. Each male flange 110 and female flange 120 may generally have a thickness (e.g., in the Z-axis direction) that is small enough to fit under a conventional cover plate (or faceplate) for an electrical outlet. In one implementation, the thickness of each of male flange 110 and female flange 120 may be about 0.070 inches.

Two or more electrical box extenders 100 may be joined side-by-side to form a multi-gang configuration. More particularly, male flange 110 may be configured to be mechanically connected to a corresponding female flange 120 (e.g., of another electrical box extender 100) without physical alteration of electrical box extender 100 and without the use of additional fasteners. Additionally, male flange 110 and female flange 120 may be positioned so as to maintain spacing of multiple electrical box extenders 100 in accordance with, for example, published electrical codes.

Male flange 110 and female flange 120 may include an interlocking structure to enable male flange 110 and female flange 120 to be removably connected. For example, male flange 110 and female flange 120 may include a compression-fit pair, a tongue-in-groove mechanism, socket connections, an integrated clip, or another mechanical form of attachment.

In one implementation, each male flange 110 may include a short post 112 on one side of electrical box extender 100 (e.g., near side 102). A portion 114 of a front surface of male flange 110 may be cut out such that post 112 does not extend (e.g., in the Z-axis direction) past the depth of male flange 110. In one implementation, portion 114 may be cut out to a depth (e.g., in the Z-axis direction) of 0.035 inches, such that post 112 may protrude 0.035 inches. Each female flange 120 may include a hole 122 matched to receive a corresponding post 112 of another male flange 110. A corresponding portion 124 (e.g., approximately equal in depth to portion 114) of a back surface of female flange 120 may also be cut out to receive male flange 110 and post 112.

Support flange 130 may span the length of all (as shown in FIG. 2), or a portion of, front edge 104a. Support flange 130 may generally extend (e.g., in the X-axis direction) perpendicular to the plane defined by side 104. Support flange 130 may extend beyond edge 104a (e.g., in the X-axis direction) approximately the width of side 102. In one implementation, support flange 130 may extend beyond edge 104a about 0.061 inches.

The front surfaces of each of male flanges 110, female flanges 120 and support flange 130 may be co-planar with each other and on a different plane than that of front edges 102a, 104a, 106a, and 108a. For example, support flange 130 may be on a separate plane from front edge 102a, such that support flange 130 may overlap front edge 102a of a different electrical box extender 100 when multiple electrical box extenders 100 are joined in a multi-gang configuration.

Mounting flanges 140 may generally extend (e.g., in the Y-axis direction) from edge 106a and edge 108a, respectively. In one implementation, each of mounting flanges 140 may extend (e.g., in the Y-axis direction) about 0.22 inches beyond the opening of corresponding channel 150. In one implementation, each mounting flange 140 may span the width (e.g., in the X-axis direction) between male flange 110 and female flange 120 along a respective edge (e.g., edge 106a or edge 106b). For example, each of mounting flanges 140 may extend (e.g., in the X-axis direction) about 0.80 inches. In another implementation, mounting flange 140 may be connected to male flange 110 and female flange 120. Each mounting flange 140 may include a mounting hole 142 that is generally aligned with a respective channel 150 to allow insertion of a screw (e.g., screw 50 of FIG. 1) through mounting hole 142 and channel 150.

The front surfaces of mounting flange 140 may be recessed (e.g., in the Z-axis direction) from the front surfaces of male flanges 110 and female flanges 120. In one implementation, mounting flanges 140 may be sufficiently recessed from the front surfaces of male flanges 110 and female flanges 120 to prevent a screw head of an installed screw (e.g., screw 50) from protruding (e.g., in the Z-axis direction) past the front surfaces of male flanges 110 and female flanges 120. Thus, in one implementation, the front surfaces of mounting flanges 140 may not be coplanar with either the front surfaces of male flanges 110 and female flanges 120 or with front edges 102a, 104a, 106a, and 108a. Mounting flange 140 may be, for example, between 0.020 and 0.070 inches thick (e.g., in the Z-axis direction).

Figure 6B:
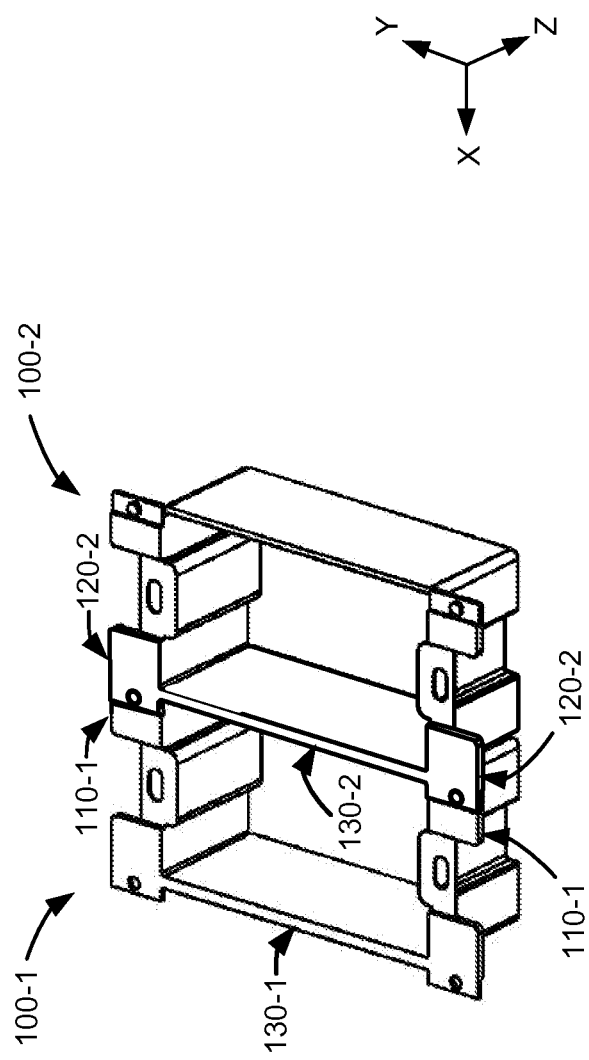

FIGS. 6A and 6B are isometric views of two electrical box extenders 100-1 and 100-2 joined in a double-gang configuration according to an implementation described herein. FIG. 6A provides an assembly view of the double-gang configuration; while FIG. 6B provides an assembled view. Referring collectively to FIGS. 6A and 6B, electrical box extender 100-1 and electrical box extender 100-2 may have identical single-gang configurations, consistent with those described above in connection with FIGS. 1-5. Thus, electrical box extender 100-1 may include two male flanges 110-1, two female flanges 120-1, and one support flange 130-1; while electrical box extender 100-2 may include two male flanges 110-2, two female flanges 120-2, and one support flange 130-2.

The two male flanges 110-2 may be mated to the corresponding female flanges 120-1 to form a double-gang arrangement. More particularly, in one implementation, posts 112 (not labeled in FIG. 6B for clarity) of male flanges 110-2 may be snapped/locked into corresponding holes 122 (also not labeled in FIG. 6B for clarity) of female flanges 120-1 to form an integrated component. When male flanges 110-2 are mated to corresponding female flanges 120-1, a portion (e.g., portion 114, FIG. 3A) of each male flange 110-2 may overlap a portion (e.g., portion 124, FIG. 3B) of a corresponding female flange 120-1. Also, support flange 130-2 may overlap one side piece (e.g., side 102) of electrical box extender 100-1. Thus, the double-gang configuration of FIG. 6B may include a smaller width (e.g., in the X-axis direction) than the combined individual widths of electrical box extender 100-1 and electrical box extender 100-2 when installed in single-gang configurations.

While FIGS. 6A and 6B illustrate a double-gang configuration for two electrical box extenders 100, additional electrical box extenders 100 may be similarly joined to create a triple-gang, quadruple-gang, etc. without requiring additional tools, modifications, fasteners, or adhesives.

Figure 7:
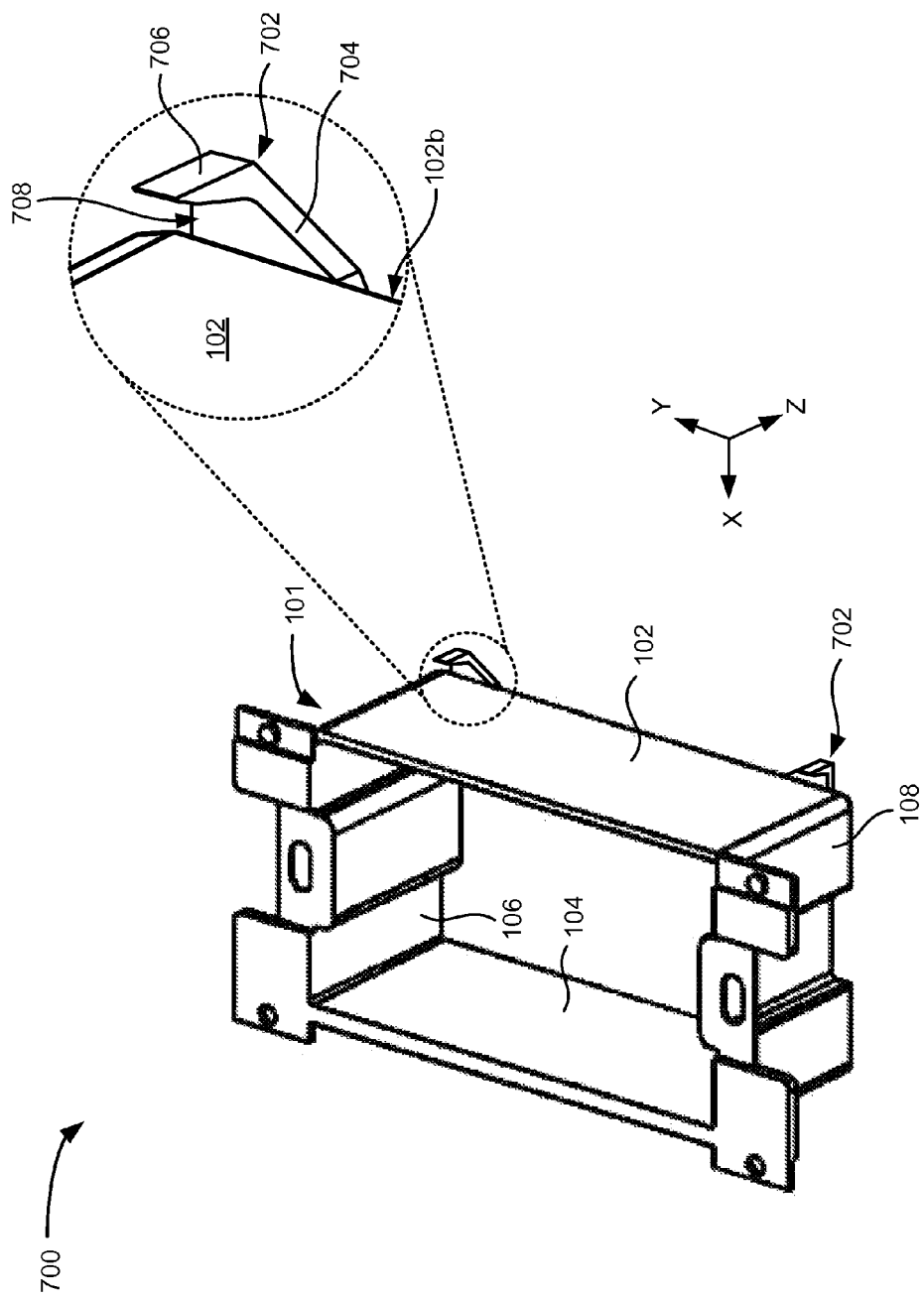
FIG. 7 is an isometric view of an electrical box extender according to another implementation described herein.
Figures 8A, 8B:
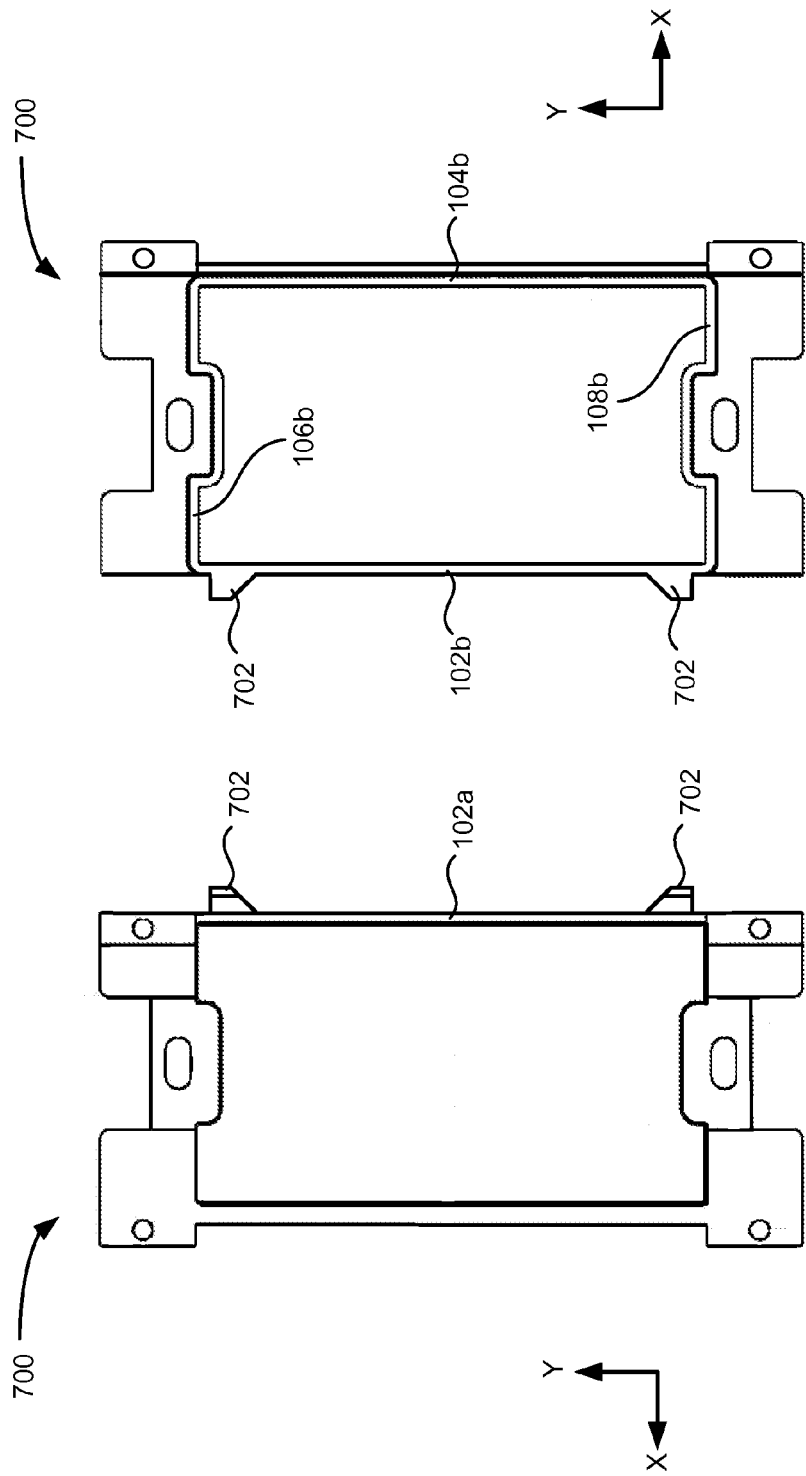
FIGS. 8A and 8B are a front view and a back view, respectively, of the electrical box extender of FIG. 7.

FIG. 7 is an isometric view of an electrical box extender 700 according to another implementation described herein. FIGS. 8A and 8B provide a front view and a back view, respectively, of electrical box extender 700.

Referring collectively to FIGS. 7-8B, electrical box extender 700 may include features previously described above in connection with electrical box extender 100. For example, electrical box extender 700 may include a generally rectangular tube 101 including first set of opposing sides 102, 104 and second set of opposing sides 106, 108. Sides 102, 104, 106, and 108 may each include a back edge 102b, 104b, 106b, and 108b, respectively. Each of back edges 102b, 104b, 106b, and 108b may generally be slid into electrical box 10 upon installation.

Electrical box extender 700 may differ from the configuration of electrical box extender 100 with the inclusion of a pair of locking tabs 702 on back edge 102b. Locking tabs 702 may be generally be configured to receive a corresponding back edge 104b (e.g., of another electrical box extender 700) when two electrical box extenders 700 are joined together (e.g., using interlocking male flanges 110 and female flanges 120, as described above). More particularly, locking tabs 702 may include a base 704 and a lip 706 that, along with side 102, form a channel 708. The width of channel 708 (e.g., along the X-axis) may be slightly larger than the thickness of side 104 so as to receive back edge 104b and secure back edge 104b between lip 706 and side 102.

In one implementation, locking tabs 702 may be included as integrally molded components with the rest of electrical box extender 700. Although two locking tabs 702 are shown in figures herein, in other implementations, a different number of locking tabs 702 may be used. Also, in other implementations, locking tabs 702 may be included in different locations, such as on back edge 104b.

Figure 9:
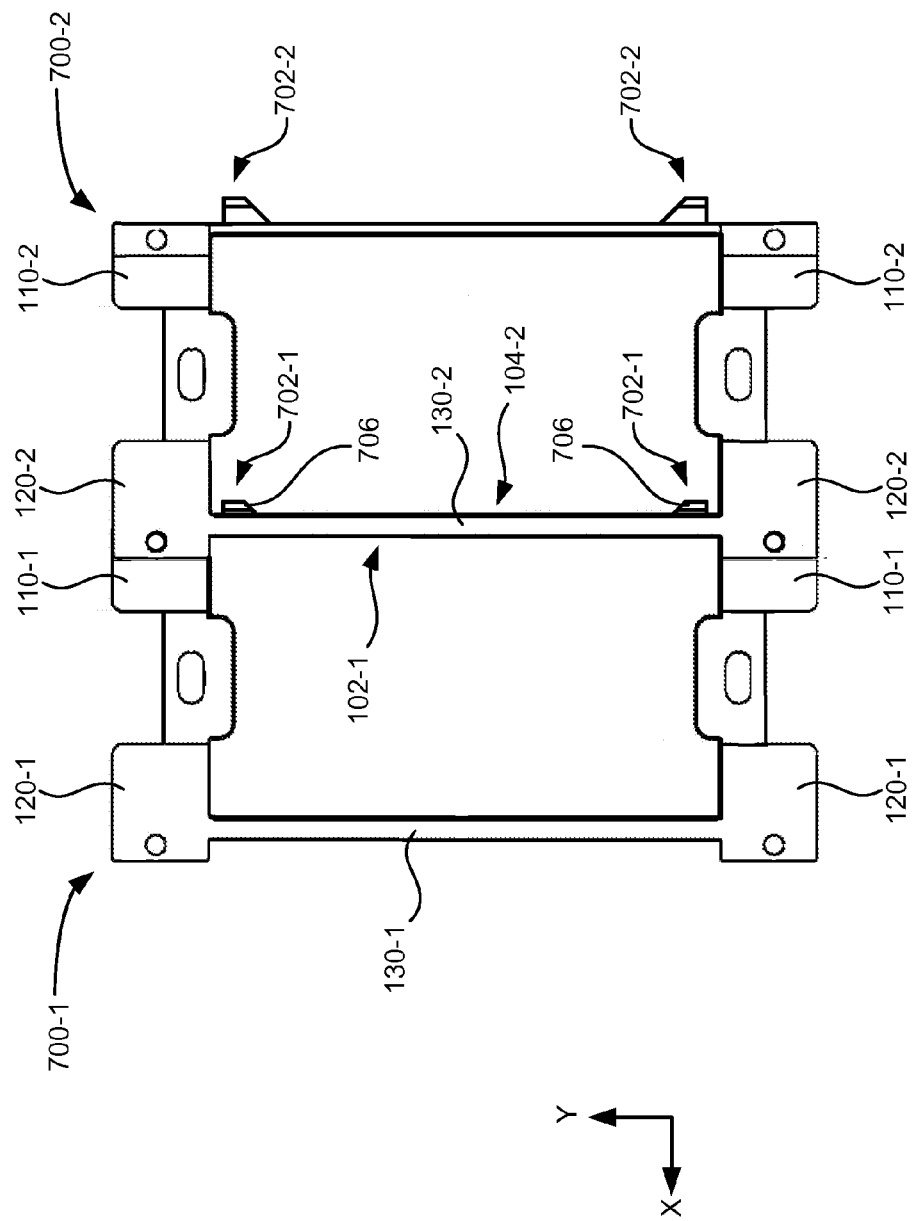
FIG. 9 is a front view of two electrical box extenders joined in a double-gang configuration according to another implementation described herein.

FIG. 9 is a front view of two electrical box extenders 700-1 and 700-2 assembled in a double-gang configuration according to an implementation described herein. Referring to FIG. 9, electrical box extender 700-1 and electrical box extender 700-2 may have identical single-gang configurations, consistent with those described above in connection with FIGS. 7-8B. Electrical box extender 700-1 may include two male flanges 710-1, two female flanges 720-1, and one support flange 730-1; while electrical box extender 700-2 may include two male flanges 710-2, two female flanges 720-2, and one support flange 730-2.

The two male flanges 110-2 may be mated to the corresponding female flanges 120-1 to form a double-gang arrangement. Back edge 104b of wall 104-2 (not visible due to support flange 130-2) may be received within channels 708 (not labeled for clarity) of locking tabs 702-1. Thus, back edge 104b of wall 104-2 may be secured between side 102-1 and lips 706 of locking tabs 702-1. When male flanges 110-2 are mated to corresponding female flanges 120-1, a portion of each male flange 110-2 may overlap a portion of a corresponding female flange 120-1. Also, support flange 130-2 may overlap one side piece (e.g., side 102-1) of electrical box extender 700-1.

While FIG. 9 illustrate a double-gang configuration for two electrical box extenders 700-1 and 700-2, additional electrical box extenders 700 may be similarly joined to create a triple-gang, quadruple-gang, etc. without requiring additional tools, modifications, fasteners, or adhesives.

FIG. 10 is a flowchart of an exemplary process 1000 for forming a multi-gang electrical box extender, according to an implementation described herein. Process 1000 may include identifying a gang quantity for an electrical box installation that requires an electrical box extender (block 1010), obtaining a number of single-gang electrical box extenders equal to the gang quantity of the electrical box installation (block 1020), and attaching, without additional modification, the single-gang electrical box extenders in a side-by-side configuration to form a multi-gang electrical box extender (block 1030). For example, a user (e.g., an electrician) may identify a double-gang electrical box that is recessed more than one-quarter inch from a finished surface of a wall. The user may gather two single-gang electrical box extenders 100 or 700 and join together the two electrical box extenders 100 or 700, as described above in connection with FIGS. 6A and 6B or FIG. 9.

In implementations described herein, electrical box extenders may include one or more male interlocking flanges extending laterally outward from a front edge of a rectangular tube, and one or more female interlocking flange extending laterally outward from the front edge of the rectangular tube. Two or more box extenders may be joined together in a side-by-side configuration to form a multi-gang electrical box extender. The male interlocking flanges of a first electrical box extender may be removably attached to the female interlocking flanges of a second electrical box extender to align the first electrical box extender and the second electrical box extender in an overlapping side-by-side arrangement. Additional boxes may be joined in a similar manner to form a desired gang size that can be inserted at least partially within a multi-gang electrical box.

Implementations described herein may provide a design for an electrical box extender that can be used as a single-gang electrical box extender or can be gangable in multi-gang configurations. Suppliers and retailers may, thus, simplify supply chain requirements by using a single part (e.g., a single stock-keeping unit (SKU)) to supply any number of electrical box extender gang configurations.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

For example, while implementations have been described in the context of a single-gang box extender as a base unit that may be joined to other units. In other implementations, the base unit may be a double-gang box extender, or a single-gang box extender may be joined to a double-gang box extender, using the concepts described herein. In another implementation, the orientation of the interlocking male and female flanges may be different than shown in the above figures. For example, in another implementation, interlocking male and female flanges may be included on left and right side (e.g., sides 102 and 104) instead of, or in addition to, the interlocking male and female flanges on the top and bottom sides (e.g., sides 106 and 108). Furthermore, in other implementation, more or fewer sets of mating flanges may be used for each electrical box extender.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. An electrical box extender, comprising:
a rectangular tube including a first pair of opposing sides, a second pair of opposing sides, a front opening, and a rear opening, wherein the first pair of opposing sides and the second pair of opposing sides are connected to form a perimeter configured to fit within a single-gang electrical box; and
a set of flanges extending laterally, at the front opening, from a front edge of one of the first pair of opposing sides, the set of flanges including a male flange and a female flange, wherein the male flange is positioned to attach to a corresponding female flange of an identical electrical box extender without physically altering either of the electrical box extender or another identical electrical box extender.

2. The electrical box extender of claim 1, further comprising:
a supporting flange extending laterally from a front edge of one of the second pair of opposing sides.

3. The electrical box extender of claim 2, wherein the supporting flange is coplanar with the female flange and wherein the supporting flange is on a different plane than the front edge of the other one of the second pair of opposing sides.

4. The electrical box extender of claim 3, wherein the supporting flange is configured to overlap the front edge of the other one of the second pair of opposing sides of the identical electrical box extender.

5. The electrical box extender of claim 1, wherein the second pair of opposing sides are parallel.

6. The electrical box extender of claim 1, wherein the one of the first pair of opposing sides includes a channel, and wherein the channel extends from the front edge of the one of the first pair of opposing sides to a back edge of the one of the first pair of opposing sides.

7. The electrical box extender of claim 1, further comprising:
a second set of flanges extending laterally, at the front opening, from another front edge of another one of the first pair of opposing sides, the second set of flanges including a second male flange and a second female flange, wherein the second male flange is configured to attach to a corresponding second female flange of the identical electrical box extender.

8. The electrical box extender of claim 1, wherein the male flange is disposed next to one of the second pair of opposing sides and wherein the female flange is disposed next to another one of the second pair of opposing sides.

9. The electrical box extender of claim 1, wherein the set of flanges is configured to engage a surface outside the perimeter to prevent insertion of the electrical box extender past the engaged surface.

10. The electrical box extender of claim 1, wherein the set of flanges is configured to fit under an electrical cover plate.

11. The electrical box extender of claim 1, wherein the electrical box extender is configured to attach to the identical electrical box extender in a side-by-side configuration.

12. The electrical box extender of claim 1, further comprising: a mounting flange extending laterally from the front edge of one of the first pair of opposing sides, the mounting flange including a mounting hole configured to receive a mounting screw, wherein a front surface of the mounting flange is on a different plane than front surfaces of the male flange and the female flange.

13. The electrical box extender of claim 1, further comprising:
a locking tab extending laterally, at the rear opening, from a back edge of one of the second pair of opposing sides, wherein the locking tab includes a lip to hold a back edge of the other of the second pair of opposing sides of the identical electrical box extender between the lip and the back edge of the one of the second pair of opposing sides.

14. A system, comprising:
a first electrical box extender including:
a rectangular tube including a first pair of opposing sides, a second pair of opposing sides, a front opening, and a rear opening, wherein the rectangular tube is sized to be inserted at least partially within a single-gang electrical box,
a male flange extending laterally outward from a front edge of the rectangular tube, and a female flange extending laterally outward from the front edge of the rectangular tube; and a second electrical box extender, identical to the first electrical box extender, wherein the male flange of the first electrical box extender is removably attached to a corresponding female flange of the second electrical box extender to align the first electrical box extender and the second electrical box extender in an overlapping side-by-side arrangement that is sized to be inserted at least partially within a double-gang electrical box, and wherein the male flange of the first electrical box extender is removably attached to the corresponding female flange of the second electrical box extender without physically altering either of the first electrical box extender or second electrical box extender.

15. The system of claim 14, wherein the second pair of opposing sides are parallel.

16. The system of claim 15, wherein the male flange and the female flange extend laterally from a front edge of one of the first pair of opposing sides, and wherein the rectangular tube further comprises:

a supporting flange extending laterally from a front edge of one of the second pair of opposing sides.

17. The system of claim 14, wherein the male flange and the female flange fit under an electrical cover plate when the first electrical box extender and the second electrical box extender are installed at least partially within the double-gang electrical box.

18. The system of claim 14, wherein the male flange and the female flange are configured to prevent insertion of the first electrical box extender and the second electrical box extender completely into the double-gang electrical box.

19. The system of claim 14, further comprising:

a third electrical box extender, identical to the second electrical box extender, wherein the male flange of the second electrical box extender is removably attached to a corresponding female flange of the third electrical box extender to align the first electrical box extender, the second electrical box extender, and the third electrical box extender in an overlapping side-by-side arrangement configured to be inserted at least partially within a triple-gang electrical box.

20. The system of claim 14, wherein the first electrical box extender further comprises a locking tab extending laterally outward from a back edge of the rectangular tube, and wherein the locking tab includes a lip to hold a back edge of the second electrical box extender between the lip and the back edge of the first electrical box extender when the male flange of the first electrical box extender is removably attached to a corresponding female flange of the second electrical box extender.

21. A method for forming a multi-gang electrical box extender, the method comprising:

obtaining a number of single-gang electrical box extenders equal to a desired multi-gang size, wherein each of the single-gang electrical box extenders includes a rectangular tube with a male flange extending laterally outward from a front edge of the rectangular tube and a female flange extending laterally outward from the front edge of the rectangular tube; and attaching, by mechanically connecting one of the female flanges of a first one of the number of single-gang electrical box extenders to one of the male flanges of a second one of the number of single-gang electrical box extenders and without modification to the first or the second one of the number of single-gang electrical box extenders, the single-gang electrical box extenders in a side-by-side configuration to form a multi-gang electrical box extender that matches the desired multi-gang size.

22. The method of claim 21, wherein each of the single-gang electrical box extenders includes at least two male flanges and at least two female flanges.

* * * * *